United States Patent
Opalka et al.

(10) Patent No.: US 10,906,105 B2
(45) Date of Patent: Feb. 2, 2021

(54) UNIFORMLY CONTROLLED NANOSCALE OXIDE DISPERSION STRENGTHENED ALLOYS

(71) Applicant: United Technologies Corporation, Farmington, CT (US)

(72) Inventors: Susanne M. Opalka, Old Chatham, NY (US); John A. Sharon, West Hartford, CT (US); Tahany Ibrahim El-Wardany, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 287 days.

(21) Appl. No.: 15/958,203

(22) Filed: Apr. 20, 2018

(65) Prior Publication Data

US 2019/0321894 A1    Oct. 24, 2019

(51) Int. Cl.
*B22F 9/08* (2006.01)
*B22F 1/00* (2006.01)
*C22C 1/10* (2006.01)
*C22C 32/00* (2006.01)

(52) U.S. Cl.
CPC ............ *B22F 9/082* (2013.01); *B22F 1/0022* (2013.01); *C22C 1/1042* (2013.01); *C22C 32/0021* (2013.01); *C22C 32/0036* (2013.01); *B22F 2001/0092* (2013.01); *B22F 2998/10* (2013.01); *B22F 2999/00* (2013.01)

(58) Field of Classification Search
CPC ........................................................ B22F 9/082
USPC ............................................................. 75/355
See application file for complete search history.

(56) References Cited

U.S. PATENT DOCUMENTS

| | | |
|---|---|---|
| 5,358,695 A | 10/1994 | Helble et al. |
| 8,609,187 B1 | 12/2013 | Kang et al. |
| 9,340,678 B2 | 5/2016 | Keszler et al. |
| 9,346,125 B2 * | 5/2016 | Park .................... B23K 26/083 |
| 2015/0093279 A1 * | 4/2015 | Kington ................ B22F 3/1055 419/19 |
| 2016/0023277 A1 | 1/2016 | Rieken et al. |
| 2016/0215364 A1 | 7/2016 | Bruck et al. |
| 2017/0225234 A1 | 8/2017 | Fan et al. |

FOREIGN PATENT DOCUMENTS

| | | |
|---|---|---|
| WO | 9416989 A1 | 8/1994 |
| WO | 2011159675 A1 | 12/2011 |

OTHER PUBLICATIONS

European Search Report dated Jul. 9, 2019 issued for corresponding European Patent Application No. 19170251.3.

* cited by examiner

*Primary Examiner* — Coris Fung
*Assistant Examiner* — Danielle Carda
(74) *Attorney, Agent, or Firm* — Bachman & LaPointe, P.C.

(57) ABSTRACT

A process of forming an oxide dispersion strengthened alloy, comprises distributing an alloy powder on a platform; applying a uniform nanometer-scale metal oxide onto the alloy powder; applying an energy beam onto the alloy powder and the uniform nanometer-scale metal oxide; and forming an oxide dispersion strengthened alloy.

21 Claims, 2 Drawing Sheets

UNIFORMLY CONTROLLED NANOSCALE OXIDE DISPERSION STRENGTHENED ALLOYS

BACKGROUND

The disclosure relates to a process of high surface area oxide powders being synthesized and combined with atomized metal powders using additive manufacturing methods.

Although oxide dispersion strengthened (ODS) alloys offer the potential for long-life high temperature thermal stability and strength, as well as creep, oxidation, and corrosion-resistance; their commercial availability has been hindered by the inherent challenges in their production. ODS alloys have been traditionally formed by a combination of processes: a) powder production by low-energy ball (attrition) milling, (electro)chemical conversion of metal compounds, or (plasma) atomization; b) metal-oxide blending by mechanical alloying with high energy milling (i.e., using Spex or planetary mills); and c) powder blend compression into primary ODS alloy stock by extrusion or hot isostatic pressing, and sintering. More recently, ODS alloys have been formed from powders using additive manufacturing methods, such as laser powder bed fusion.

High surface area oxide powders can also be synthesized and combined with atomized metal powders using additive manufacturing methods. While the mechanical and thermal attributes of ODS alloys increase with the decreasing size and uniformity of the dispersed phases and the dispersion medium, these benefits are challenging to realize in practice. First, it is difficult to control the uniformity, purity, and size of oxide phases using traditional or additive manufacturing methods. The mechanical dispersion of oxides is limited by the minimum size limit of their as-synthesized powder feeds, where the particles are typically tens of nanometers or larger in diameter and have the propensity to aggregate in clusters that can range up to microns in diameter. Blending by mechanical milling also introduces highly cold-worked microstructures, possible contamination, and broadening in their particle/grain size distributions. This can cause higher surface reactivity, where metal particle oxidation can interfere with ODS alloy consolidation. Additional processing may be required to clean the feedstock from process control agents employed during milling, to eliminate high stress or defect states and refine mechanical properties.

SUMMARY

In accordance with the present disclosure, there is provided a process of forming an oxide dispersion strengthened alloy, comprising distributing an alloy powder on a platform; applying a uniform nanometer-scale metal oxide onto said alloy powder; applying an energy beam onto said alloy powder and said uniform nanometer-scale metal oxide, so as to form an oxide dispersion strengthened alloy.

In another and alternative embodiment the nanometer-scale metal oxides are produced by spray atomization of nanoscale polynuclear metal oxide-hydroxide clusters in a carrier fluid.

In another and alternative embodiment the nanometer-scale metal oxides are produced by electrospray of nanoscale polynuclear metal oxide-hydroxide clusters in a carrier fluid.

In another and alternative embodiment, the oxide dispersion strengthened alloy comprises an aluminum based alloy and a nano-oxide, such as alumina.

In another and alternative embodiment, the nano-oxide is uniformly dispersed throughout said oxide dispersion strengthened alloy.

In another and alternative embodiment, the nano-oxide comprises about 0.1 vol. % to about 10 vol. % of said oxide dispersion strengthened alloy.

In another and alternative embodiment, the nano-oxide comprises between 1 nanometer and 300 nanometers in diameter.

In another and alternative embodiment, the process further comprises rapid melting, mixing and solidification of the uniform nanometer-scale metal oxide with said alloy powder.

In another and alternative embodiment, the process further comprises consolidating the uniform nanometer-scale metal oxide with the alloy powder comprising a laser powder bed fusion of the uniform nanometer-scale metal oxide with the alloy powder.

In another and alternative embodiment, the process further comprises uniform nanometer-scale metal oxide with said alloy powder comprises laser powder bed fusion of said uniform nanometer-scale metal oxide with said alloy powder.

In another and alternative embodiment, the uniform nanometer-scale metal oxide is derived from $Al_{13}$ polynuclear oxide-hydroxide clusters.

In another and alternative embodiment, an oxide conversion and an alloy consolidation occurs simultaneously.

In another and alternative embodiment, the uniform nanometer-scale metal oxide comprises polynuclear metal oxide-hydroxide clusters.

In another and alternative embodiment, the polynuclear metal oxide-hydroxide clusters are selected from the group consisting of polynuclear clusters containing Y, Fe, Cr, and group VI (Mo, W) transition metals, and La, Ce and/or other rare earth metals.

In another and alternative embodiment, the oxide dispersion strengthened alloy comprises a copper based alloy and alumina nano-oxide dispersion.

In another and alternative embodiment, the oxide dispersion strengthened alloy comprises a nickel based alloy and one of an alumina, a chromia, an yttria, a ceria, a lanthanum oxide, and/or other rare earth oxide, nano-oxide dispersion.

In another and alternative embodiment, the oxide dispersion strengthened alloy comprises an iron based alloy and one of an alumina, a chromia, an yttria, a ceria, a lanthanum oxide, and/or other rare earth oxide, nano-oxide dispersion.

In another and alternative embodiment, the oxide dispersion strengthened alloy comprises a molybdenum based alloy and one of an alumina, a chromia, an yttria, a ceria, a lanthanum oxide, and/or other rare earth oxide, nano-oxide dispersion.

In another and alternative embodiment, the uniform nanometer-scale metal oxide is formed separately or formed in-situ using a precursor or formed ex-situ.

In another and alternative embodiment, the uniform nanometer-scale metal oxide powder is formed by electrospray atomization.

Other details of the process are set forth in the following detailed description and the accompanying drawings wherein like reference numerals depict like elements.

DETAILED DESCRIPTION

The oxide dispersion strengthened (ODS) alloy can be formed from an alloy combined with nano-oxide particles. The nano-oxide particles can be formed in at least 3 ways, via: 1) A separate feed of metal oxide precursors, in the form of polynuclear metal oxide-hydroxide clusters, is contained within a solution or dispersion. The precursor feed is atomized or electro-sprayed to form droplets that uniformly encompass one or more precursor clusters. There are other physical methods for spray atomization, such as using a high speed air velocity, ultrasonic vibration, etc. in addition to or in replacement of the electromotive force. Energy beam, laser or heat treatment is applied to facilitate condensation reactions and atomic rearrangements that transform the sprayed polynuclear precursors into uniform nanoscale metal oxide powders, as well as to facilitate volatilization of carrier fluids. For example, $Al_{13}$ nanocluster precursors are converted to metastable or α-phase alumina ($Al_2O_3$) nanoparticles, depending on the treatment conditions. The oxide feed is later dispersed with metal. 2) Another embodiment can include an ex-situ dispersion. With ex-situ dispersion, the precursor solution can be sprayed onto metal powder feedstock and heat treated for conversion into dispersed metal oxides. Deformation processing can be used to incorporate the nano-oxides into a billet. 3) The third embodiment can include a process in which an in-situ dispersion is performed. The solution of $Al_{13}$ nanocluster precursors can be sprayed onto atomized metal powders, during additive manufacturing processes, such as powder bed fusion or directed energy deposition. The deposition of the atomized oxide precursors is conducted in combination with the laser processing, where oxide conversion and part consolidation occurs simultaneously.

For the nano-oxides, it is advantageous if they are similar in size and evenly spaced in the matrix metal. A volume fraction of oxide is added to the matrix and if the oxides are smaller, then they are spaced closer together. In an exemplary embodiment, the oxides can to be between 1 nanometers and 300 nanometers. For consistent behavior the average size can be +/−10% of the nominal particle size.

Figure 1:
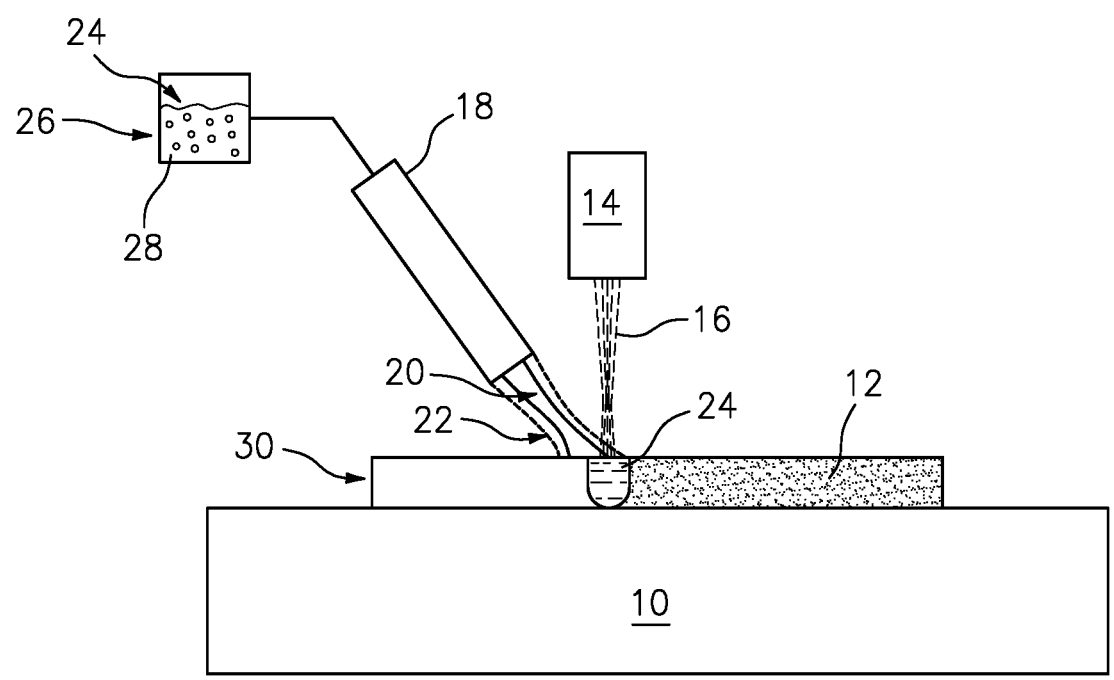
FIG. 1 is a schematic of an exemplary oxide dispersion strengthened alloy process according to the disclosure.

Referring to FIG. 1, an exemplary oxide dispersion strengthened alloy process arrangement is shown. A platform 10 is configured to support an alloy powder 12. In an exemplary embodiment, the alloy powder 12 comprises a nickel alloy. In addition other alloys, such as, aluminum, copper, titanium, iron, cobalt, molybdenum, and tungsten based alloys can be utilized. An energy beam, such as a laser 14 can be positioned with respect to the platform 10 so as to impart energy into the alloy powder 12 on the platform 10. The laser 14 emits a laser beam 16 that can transfer a large amount of energy into a focal region instantaneously to solidify or cure materials, therefore enabling high-precision and high-throughput manufacturing for a wide range of materials.

A spray nozzle 18 is configured to spray a material containing uniform nanometer-scale metal oxide precursors 20 onto the alloy powder 12. In an exemplary embodiment, an inert gas 22 and/or a solution 24 can be co-sprayed with the uniform nanometer-scale metal oxide precursors 20 to enhance transport and the melting/mixing between the nanometer-scale metal oxide precursors 20 and the alloy powder 12.

The solution 24 can comprise the uniform nanometer-scale metal oxide precursors 20 in clusters 26 utilized in the exemplary process. An exemplary uniform nanometer-scale polynuclear metal oxide-hydroxide cluster 26 can comprise $Al_{13}$. The solution 20 can include a carrier fluid 28. Examples of carrier fluid 28 can include fluids that could be used to dissolve or disperse these clusters, such as, water, ethanol, acetone, ethyl acetate, and the like. In addition, solvents can include those with polar functional groups that can interact strongly with the polynuclear metal oxide-hydroxide clusters. If less polar media is desired, amphiphilic surfactants containing both polar and non-polar functional groups, may be used to facilitate complete dispersion of the metal oxide-hydroxide clusters.

The exemplary process can include the formation of the uniform nanometer-scale metal oxide precursors in the form of polynuclear metal oxide-hydroxide clusters 26. Uniform polynuclear metal oxide-hydroxide clusters 26 are synthesized by: a) neutralization, b) electroless reduction, or c) electrolysis of metal salt solutions.

In an exemplary embodiment, for example, high purity nanoscale polynuclear aluminum oxide-hydroxide clusters, such as, a 1 nanometer $Al_{13}$ cluster, $[AlO_4Al_{12}(OH)_{24}(H_2O)_{12}]^{7+}$, can be synthesized from an aluminum nitrate solution by controlled titration with a basic solution and followed by precipitation-washing.

In other exemplary embodiments, the uniform nanometer-scale metal oxide precursors 26 can comprise other possible polynuclear or heteronuclear metal oxide-hydroxide clusters to be utilized as precursors for forming other metal oxide nanoparticles. For example, polynuclear clusters can also be prepared from Fe, Cr, and group VI (Mo, W) transition metals, the latter which form the isopoly and heteropoly Keggin complexes. Polynuclear clusters may be prepared with Y, Ce, La, and/or other rare earth metals.

As the nanometer-scale metal oxide 20 is applied to the alloy powder 12, the laser 14 applies the laser beam 16 to heat the alloy powder 12 and the uniform nanometer-scale metal oxide clusters 26 such that oxide conversion and part consolidation occurs simultaneously. The result is an oxide dispersion strengthened alloy 30.

Figure 2:
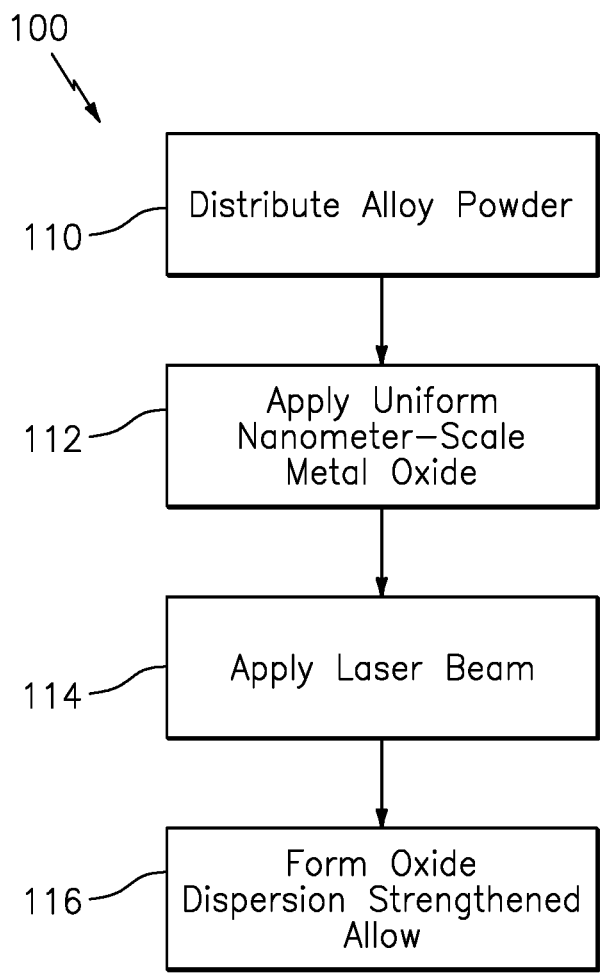
FIG. 2 is a process map of an exemplary oxide dispersion strengthened alloy process according to the disclosure.

Referring to FIG. 2, the exemplary process of forming an oxide dispersion strengthened alloy 100 is illustrated. The process 100 can include distributing an alloy powder 12 on a platform 10, at step 110. The process 100 includes at step 112, applying a material containing a uniform nanometer-scale metal oxide 20 onto the alloy powder 12. The next step 114 in the exemplary process 100 includes applying a laser beam 16 onto the alloy powder 12 and the material containing uniform nanometer-scale metal oxide 20. At step 116, an oxide dispersion strengthened alloy 30 is formed.

In other exemplary embodiments, electrospray or plasma atomization can be used to produce and deposit uniform nanoscale metal oxide clusters 26 from polynuclear metal oxide-hydroxide clusters at the smallest possible scale and the highest dimensional control onto the alloy powder 12.

In an exemplary embodiment, the process of forming an oxide dispersion strengthened alloy can be accomplished by application of an energy beam to consolidate a composite feedstock dispensed onto a build platform. The process can include creating the nano-oxide separately, then spread the nano-oxide on top of the distributed alloy powder layer. The process can include coating the alloy powder with precursor and heat treat it for ex-situ formation of the nano-oxide which then sits on the surface of the alloy powder particles. In this sense the alloy-oxide powder would be distributed on the powder bed as a single feedstock. The process can include spreading a layer of alloy powder, and then spraying a layer of precursor and then the energy beam is applied, the nano-oxide is formed in-situ along with the final oxide dispersion system.

The disclosure includes the synthesis of uniform nano-oxides that are combined with metal alloy powder through additive manufacturing to create an oxide dispersion strengthened system.

In exemplary embodiments, the alloy can include aluminum-based and copper-based alloys that can be utilized with alumina nano-oxide dispersion. In another exemplary embodiment, the alloy powder can include nickel based, iron based, and molybdenum based alloys utilized with yttria, ceria, lanthanum, and/or other rare earth nano-oxide dispersions. In other exemplary embodiments, ceria oxide can be utilized with aluminum alloys and/or reinforce aluminum alloys with both alumina and ceria.

Production of ODS alloys via additive methods results in increased material and energy efficiencies and higher throughput, compared to attrition or other mechanical alloying processing which require process control agents (like steric acid) that must subsequently be cleaned from the feedstock.

The exemplary process provides the means for nano-structural optimization and control of mechanical properties with minimum preparation of the powder stock.

ODS alloys with lower concentrations of defect structures are more likely to be more amenable to traditional machining processing and have a wide and stable processing windows.

The uniformly dispersed nanoscale oxides will have high resistance to coarsening and minimize variability in creep life.

There has been provided a process of forming an oxide dispersion strengthened alloy. While the process of forming an oxide dispersion strengthened alloy has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process of forming an oxide dispersion strengthened alloy, comprising:
    distributing an alloy powder on a platform;
    applying a uniform nanometer-scale metal oxide onto said alloy powder, said uniform nanometer-scale metal oxide comprises polynuclear metal oxide-hydroxide clusters;
    applying an energy beam onto said alloy powder and said uniform nanometer-scale metal oxide, so as to form an oxide dispersion strengthened alloy.

2. The process of claim 1, where the uniform nanometer-scale metal oxide are produced by spray atomization of nanoscale polynuclear metal oxide-hydroxide clusters in a carrier fluid.

3. The process of claim 2, where the uniform nanometer-scale metal oxide are produced by electrospray of nanoscale polynuclear metal oxide-hydroxide clusters in a carrier fluid.

4. The process of claim 1, wherein said oxide dispersion strengthened alloy comprises an aluminum based alloy and the uniform nanometer-scale metal oxide.

5. The process of claim 1, wherein uniform nanometer-scale metal oxide is dispersed throughout said oxide dispersion strengthened alloy.

6. The process of claim 5, wherein said uniform nanometer-scale metal oxide comprises about 0.1 vol. % to about 10 vol. % of said oxide dispersion strengthened alloy.

7. The process of claim 5, wherein said uniform nanometer-scale metal oxide comprises between 1 nanometer and 300 nanometers in diameter.

8. The process of claim 1, further comprising rapid melting, mixing and solidification of the uniform nanometer-scale metal oxide with said alloy powder.

9. The process of claim 1, further comprising:
    consolidating said uniform nanometer-scale metal oxide with said alloy powder comprising a laser powder bed fusion of said uniform nanometer-scale metal oxide with said alloy powder.

10. The process of claim 1, wherein said uniform nanometer-scale metal oxide is derived from $Al_{13}$ polynuclear oxide-hydroxide clusters.

11. The process of claim 1, wherein deposition of atomized oxide precursors is conducted in combination with laser processing, wherein an oxide conversion and an alloy consolidation occurs simultaneously.

12. The process of claim 1, wherein said polynuclear metal oxide-hydroxide clusters are selected from the group consisting of Y, Fe, Cr, group VI transition metals, La, Ce and other rare earth metals.

13. The process of claim 1, wherein said oxide dispersion strengthened alloy comprises a copper based alloy and alumina nano-oxide dispersion.

14. The process of claim 1, wherein said oxide dispersion strengthened alloy comprises a nickel based alloy and one of an alumina, a chromia, an yttria, a ceria, a lanthanum oxide, rare earth oxide, nano-oxide dispersion.

15. The process of claim 1, wherein said oxide dispersion strengthened alloy comprises an iron based alloy and one of an alumina, a chromia, an yttria, a ceria, a lanthanum oxide, other rare earth oxide, nano-oxide dispersion.

16. The process of claim 1, wherein said oxide dispersion strengthened alloy comprises a molybdenum based alloy and one of an alumina, a chromia, an yttria, a ceria, a lanthanum oxide, other rare earth oxide, nano-oxide dispersion.

17. The process of claim 1, wherein said uniform nanometer-scale metal oxide is formed separately.

18. The process of claim 1, wherein said uniform nanometer-scale metal oxide is formed ex-situ.

19. The process of claim 1, wherein said uniform nanometer-scale metal oxide powder is formed by electrospray atomization.

20. A process of forming an oxide dispersion strengthened alloy, comprising:
    distributing an alloy powder on a platform;
    applying a material containing uniform nanometer-scale metal oxide precursor and said alloy powder;
    applying an energy beam onto said uniform nanometer-scale metal oxide precursor precursor and said alloy powder, wherein a nanometer-scale metal oxide is formed in-situ by use of the uniform nanometer-scale metal oxide precursor so as to form an oxide dispersion strengthened alloy.

21. A process of forming an oxide dispersion strengthened alloy, comprising:
    distributing an alloy powder on a platform;
    applying a uniform nanometer-scale metal oxide onto said alloy powder;

applying an energy beam onto said alloy powder and said uniform nanometer-scale metal oxide, so as to form an oxide dispersion strengthened alloy, wherein said oxide dispersion strengthened alloy comprises a copper based alloy and alumina nano-oxide dispersion.

\* \* \* \* \*